United States Patent

Watanabe et al.

[11] Patent Number: 5,759,456
[45] Date of Patent: Jun. 2, 1998

[54] PLASTIC SHEET MANUFACTURING METHOD AND APPARATUS

[75] Inventors: Hitomu Watanabe; Makoto Honda, both of Tokyo-To, Japan

[73] Assignee: Dai Nippon Printing Co, Ltd., Japan

[21] Appl. No.: 609,375

[22] Filed: Mar. 1, 1996

[30] Foreign Application Priority Data

Mar. 3, 1995 [JP] Japan .................... 7-068973

[51] Int. Cl.$^6$ .................... B29C 33/04
[52] U.S. Cl. .................... 264/2.5; 264/40.6; 264/328.16; 425/143; 425/547; 425/808
[58] Field of Search .................... 249/79, 80, 81; 425/547, 552, 406, 407, 143, 144, 808; 264/40.6, 2.5, 328.16, 403

[56] References Cited

U.S. PATENT DOCUMENTS

| | | | |
|---|---|---|---|
| 3,265,800 | 8/1966 | Trunk | 264/328.16 |
| 3,579,738 | 5/1971 | Beattie | 425/407 |
| 3,887,350 | 6/1975 | Jenkins | 65/267 |
| 4,251,479 | 2/1981 | Pecht et al. | 264/40.6 |
| 4,254,065 | 3/1981 | Ratkowski | 264/2.5 |
| 4,295,628 | 10/1981 | Kupf et al. | 249/79 |
| 4,338,068 | 7/1982 | Suh et al. | 425/552 |
| 4,963,312 | 10/1990 | Muller | 264/328.16 |
| 5,055,025 | 10/1991 | Muller | 425/547 |
| 5,376,317 | 12/1994 | Maus et al. | 425/552 |

FOREIGN PATENT DOCUMENTS

| | | |
|---|---|---|
| 0 099 735 A2 | 2/1984 | European Pat. Off. |
| 0 414 898 A1 | 3/1991 | European Pat. Off. |
| 63-302 011 | 12/1988 | Japan |
| 06 000 892 | 1/1994 | Japan |
| 07 001 458 | 1/1995 | Japan |

*Primary Examiner*—Mathieu D. Vargot
*Attorney, Agent, or Firm*—Parkhurst & Wendell, L.L.P

[57] ABSTRACT

The method and apparatus can manufacture a plastic sheet of uniform thickness and reduced distortion, by use of metallic molds and in accordance with cast molding polymerization (casting) technique. The plastic sheet manufacturing apparatus for manufacturing a plastic sheet by injecting a raw material into a polymerization cell (101) and by polymerizing the injected raw material by heat, includes a pair of first and second molds (104A, 104B) for forming the polymerization cell (101); and first and second heat conductors (102, 103) attached to both outside surfaces of the first and second molds, respectively, so as to be opposed to each other and to sandwich the first and second molds therebetween. Here, in particular, each of the first and second heat conductors is formed with a fluid passage (210) therein to circulate a heated fluid whose temperature is controlled.

18 Claims, 7 Drawing Sheets

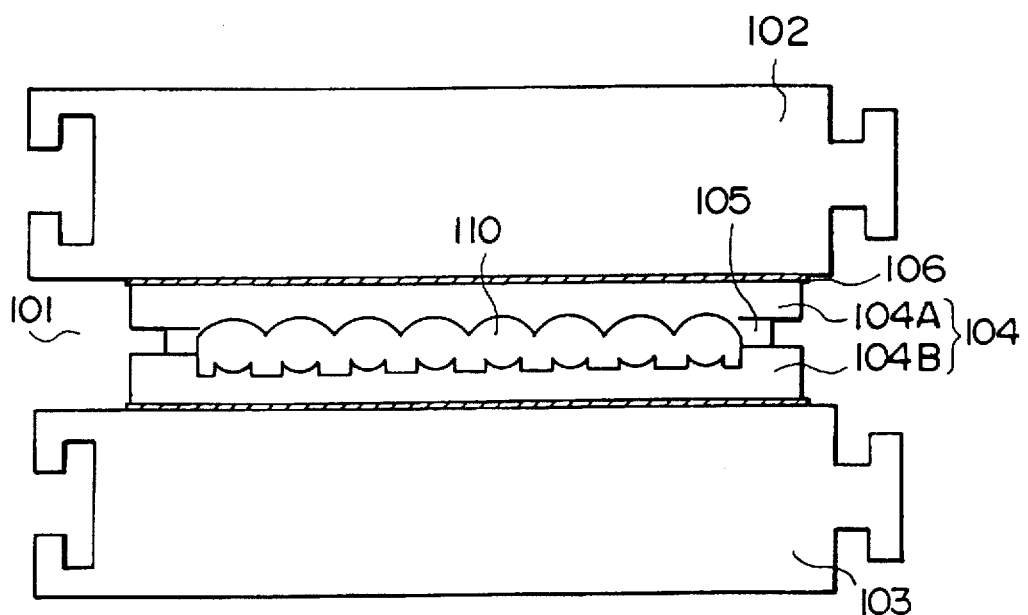
FIG. IA
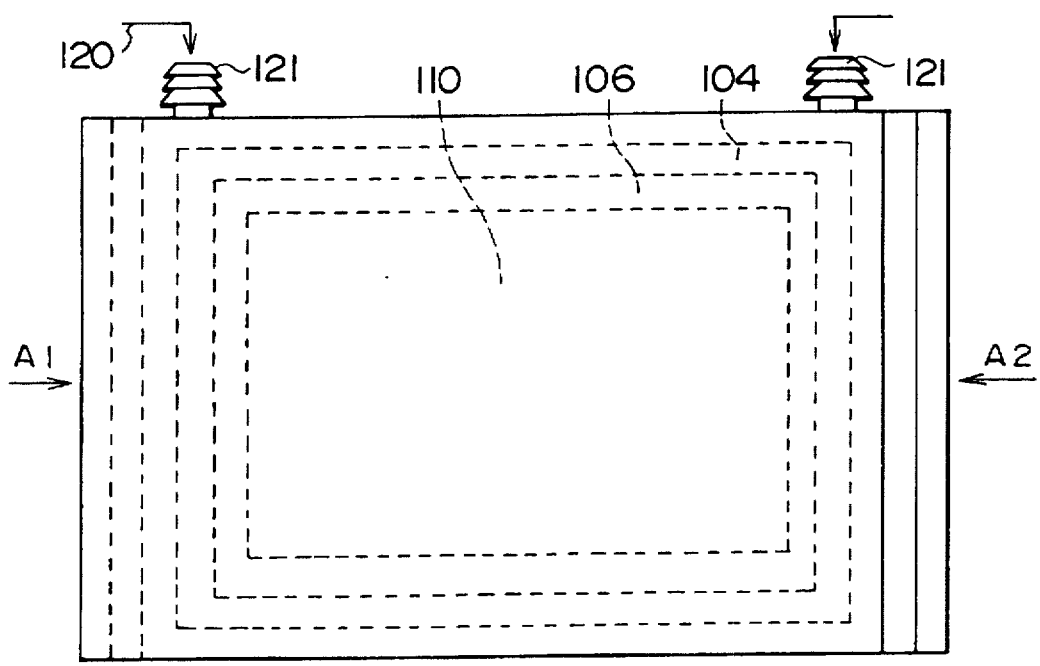
FIG. IB

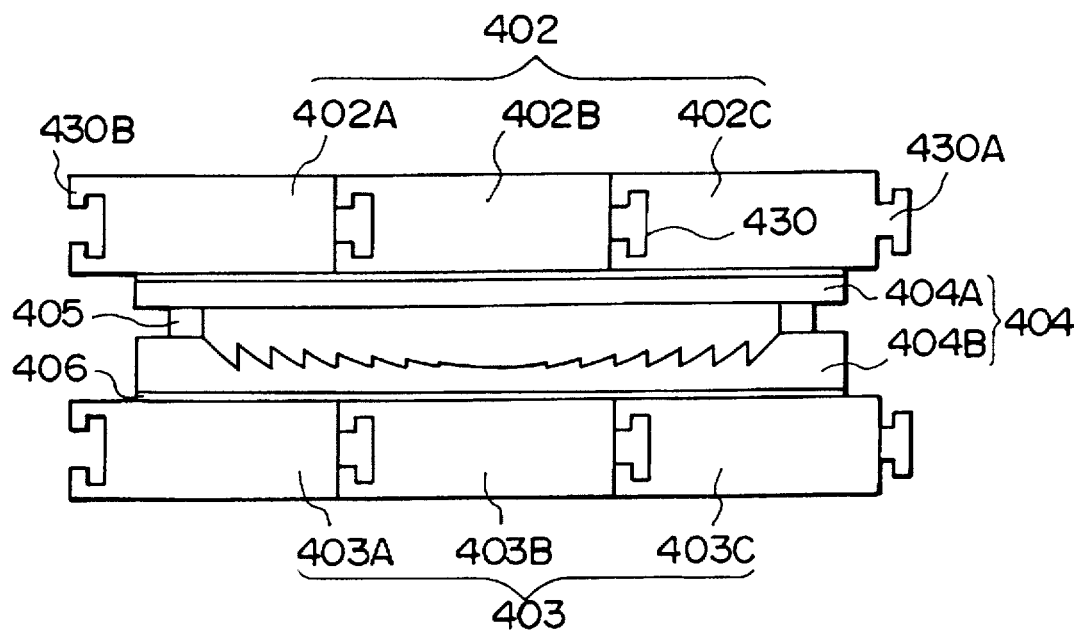
F I G . 4 A
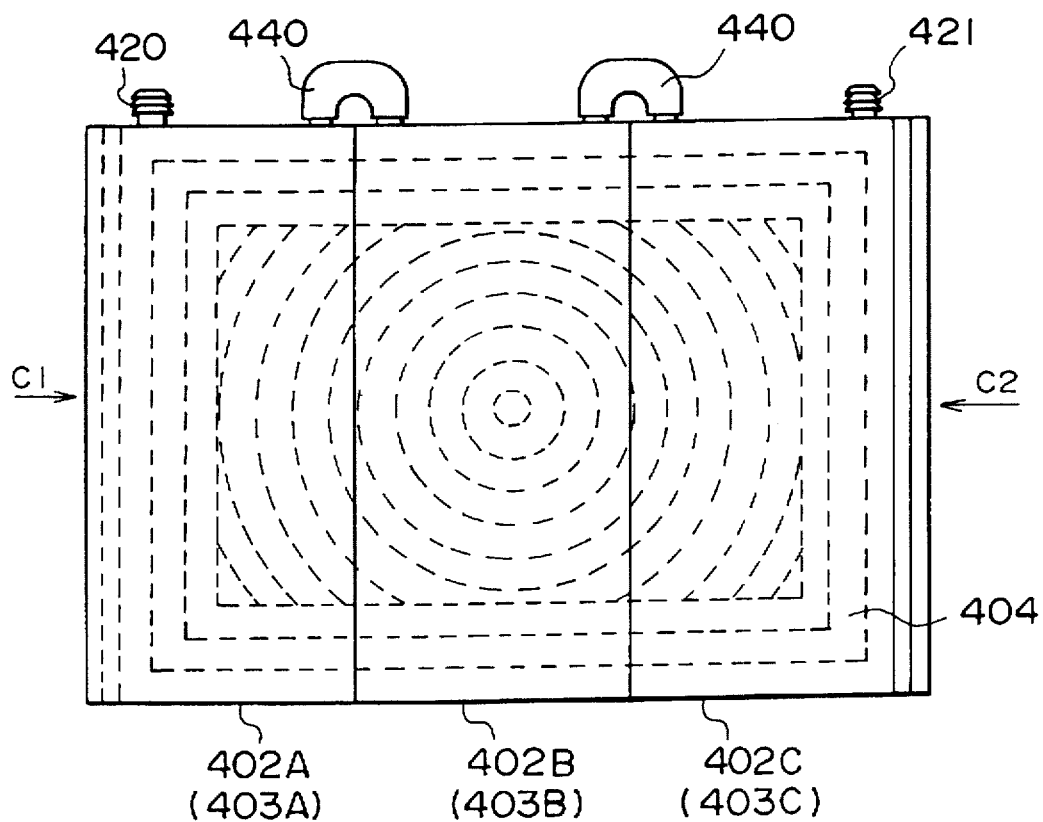
F I G . 4 B

PLASTIC SHEET MANUFACTURING METHOD AND APPARATUS

BACKGROUND OF THE INVENTION

The present invention relates to a plastic sheet manufacturing method and apparatus, and more specifically to a method and apparatus for manufacturing a plastic sheet formed with a great number of lenses, for instance on the surface thereof by cast molding.

In a cast molding polymerization method (casting method) such that a reactive raw material (e.g., a fluid resin or monomer) is injected into a polymerization cell and then polymerized or hardened to obtain a molded product, air is so far used as the heating medium to polymerize the raw material for hardening. In this case, conventionally, a hot air oven is often used to pass air from one side to the other side of the polymerization cell (e.g., composed of upper and lower molds and a frame). In this method, however, there exists a problem in that since the thermal conductivity of air (as the gas) is low, it is difficult to raise the air temperature or to absorb heat from the air sufficiently.

In addition, since the gas (air) of low heat conductivity is allowed to flow from one side to the other side of the polymerization cell, the polymerization cell is first heated by air on the air inlet port side (air incoming side), so that the raw material is first polymerized on the air inlet port side. On the other hand, the raw material is polymerized later on the air outlet port side (air outgoing side), so that a problem often arises in that the molded product is deformed or distorted.

As a result, when a plastic sheet is molded by this method, since a uniform polymerization cannot be obtained, various problems exist in that the thickness of the molded sheet disperses or the sheet internal stress or strain is generated inside the sheet.

To overcome these problems, it has been known that water is used as the heating medium instead of air and a raw material is polymerized in a water bath. In this method, since the thermal conductivity of water is higher than that of air, the polymerization cell can be heated quickly at the early stage of the polymerization process, with the result that there exists an advantage that the polymerization time can be shortened. In this method, on the other hand, since water easily rusts the metal and thereby the metallic molds are easily stained, this method is not practical particularly when a lens sheet is manufactured, because a high transparency is required for the lenses formed on the sheet.

Further, when two thin-walled metallic molds are used to manufacture an embossed sheet in accordance with the casting method, conventionally the central portion of each molds are easily deformed by the weight of the molds themselves, so that there exists a problem in that the upper and lower molds are brought into contact with each other. To overcome this problem, the molds are so far formed in such a way that the central portion of each mold is curved into a convex shape. Therefore, when the raw material is molded, the uniformity of the thickness of the molded sheet is further degraded. In other words, it has been so far impossible to mold a sheet whose thickness is lower than a predetermined value.

Further, when the thin-walled metallic molds are used, the stress hysteresis is easily accumulated in the metallic molds due to the cubic (volume) contraction of the metallic molds, so that there exists another problem in that the metallic molds are easily distorted and thereby the life time of the molds is shortened. On the other hand, when thick-walled metallic molds are used, there arises no problem with respect to the deformation or bending of the central portion of the molds by their weight. In this case, however, since the heat of the hot air oven cannot be easily transmitted to the inner sides of the metallic molds due to the large thickness of each mold, there inevitably exists a temperature difference between the outer surfaces of the metallic molds and the inner surfaces of the metallic molds (the liquid side of the raw material). Therefore, the temperature of the molds is high on the outside thereof but low on the insides thereof at the early stage of the mold heating process, so that the metallic molds are easily deformed into a convex shape relative to the cell. In contrast with this, however, when the polymerization begins, the temperature of the molds is high on the insides thereof but low on the outside thereof, so that the metallic molds are easily deformed into a concave shape relative to the cell. As a result, it has been impossible to use the thick-walled metallic molds when a thin sheet or an embossed sheet is required to be molded. In addition, in the case of the thick-walled metallic molds, the deformation hysteresis of the molds remains, so that the life time of the molds is also not long.

On the other hand, conventionally, a plastic sheet having a thickness of about 2.0 mm has been so far molded by use of glass molds and in accordance with the casting method. In this case, however, it is difficult to form the glass molds into a complicated shape, respectively, so that the use of the glass molds is limited only to a flat sheet or plate. In other words, it is impossible to use the glass molds, when a plastic sheet formed with minute convex or concave portions (e.g., Fresnel lenses, lenticular lenses) is required to be molded.

In summary, when a plastic sheet is required to be molded by use of two metallic molds and in accordance with the casting method; that is, when raw material is polymerized by use of the metallic molds and the hot air oven, various problems so far exist.

On the other hand, in the case of a Fresnel lens used for a projection screen, a thin lens sheet has been required more and more, in order to improve the performance thereof. The conventional thickness of a relatively small-sized lens sheet used for the ordinary household appliance is about 3 mm. Recently, however, a lens sheet as thin as 1.5 to 2.0 mm has been required. Further, in the case of a large-sized screen for business use, a thinner lens sheet is required more and more.

SUMMARY OF THE INVENTION

With these various problems in mind, therefore, it is an object of the present invention to provide a method and apparatus for manufacturing a plastic sheet, in particular a thin-walled plastic lens sheet, by which the polymerization cell temperature can be raised quickly and uniformly, while reducing the dispersion of the sheet thickness and the internal strain, when raw material is polymerized by use of metallic molds and in accordance with the casting method.

To achieve the above-mentioned object, the present invention provides a plastic sheet manufacturing apparatus for manufacturing a plastic sheet by injecting a raw material into a polymerization cell and by polymerizing the injected raw material by heat, which comprises: first and second molds for forming the polymerization cell; and first and second heat conductors attached to both outside surfaces of said first and second molds, respectively so as to be opposed to each other and to sandwich said first and second molds therebetween, each of said first and second heat conductors being formed with a fluid passage therein to circulate a heated fluid whose temperature is controlled.

Further, it is preferable that the polymerization cell is formed with a pattern for forming a plurality of lenses in any one or both surfaces of the plastic sheet.

Further, it is preferable that the heated fluid is accumulated within a plurality of fluid tanks each connected to the fluid passages of said first and second heat conductors, respectively, in such a way as to be selectively switched, the heated fluids accumulated within the fluid tanks being controlled at different constant temperatures, respectively.

Further, it is preferable that each of said first and second heat conductors is composed of a plurality of heat conducting plates connected to one another and attached to each outside surface of said first and second molds; each heat conducting plate being formed with at least one passage for allowing the heated fluid to flow therein, and with an engage portion formed in one side portion thereof and another engage portion formed in the other opposing side portion thereof so as to be engaged with the engage portion formed in one side portion thereof; each heat conducting plate being further formed with at least two connect portions for connecting each passage of each heat conducting plate.

Further, it is preferable that the heat conducting plate is formed into roughly a square shape, and the engage portions and the connect portions are formed on two mutually-different sides of the heat conducting plate, respectively.

Further, it is preferable that each of said first and second heat conductors is formed with at least one hollow portion different from the fluid passage therein.

Further, it is preferable that said first and second molds are made of a metal.

Further, it is preferable that said first and second heat conductors are fixedly bonded to outer side surfaces of said first and second molds, respectively.

Further, the present invention provides a plastic sheet manufacturing method of manufacturing a plastic sheet by injecting a raw material into a polymerization cell and by polymerizing the injected raw material by heat, which comprises the steps of: preparing first and second molds for forming the polymerization cell; attaching first and second heat conductors to both outside surfaces of the first and second molds, respectively so as to be opposed to each other and to sandwich the first and second molds therebetween, each of the first and second heat conductors being formed with a fluid passage therein; and circulating a heated fluid whose temperature is controlled, through the fluid passages formed in both the first and second heat conductors, during polymerization process of the raw material.

Further, it is preferable that the heated fluid controlled at a constant temperature different according to each manufacturing process is circulated through the fluid passages of the first and second heat conductors.

Further, it is preferable that the heated fluid controlled at a constant temperature during the polymerization process is circulated through the fluid passages of the first and second heat conductors.

Further, it is preferable that the polymerization process is divided into a plurality of different processes, and the heated fluid controlled at a constant different temperature is circulated through the fluid passages of the first and second heat conductors for each divided process.

Further, it is preferable that the polymerization cell is formed with a pattern for forming a plurality of lenses in any one or both surfaces of the plastic sheet.

In the plastic sheet manufacturing method and apparatus according to the present invention, it is possible to manufacture a plastic sheet of less thickness dispersion and less internal stress or strain by use of a pair of metallic molds and in accordance with the casing method. In addition, a thin-walled plastic sheet can be also manufactured.

In more detail, when the thermal polymerization is made, a pair of the metallic molds for forming a polymerization cell are sandwiched between a pair of opposing heat conductors through each of which a fluid is allowed to flow. In this case, the heated fluid is circulated through the fluid passage formed in the two heat conductors under temperature control conditions. Therefore, it is possible to control the temperature of the polymerization cell quickly and to reduce a difference in temperature within the polymerization cell, without generating any internal strain caused by hot air blown by a hot air oven against the molded product as with the case of the prior art method.

Further, since the heated fluid whose temperature is controlled is allowed to flow through the fluid passages formed in the heat conducting plates, the metallic molds will not contact directly with water, being different from the prior art method for controlling the metallic mold temperature within a water bath. Therefore, it is possible to prevent the metallic molds from being rusted or stained, so that a lens sheet which requires a high transparency can be manufactured stably, without causing any problems.

Further, since the polymerization cell is formed by a pair of thin-walled metallic molds, and further the two thin-walled metallic modes are fixedly bonded to a pair of heat conducting plates, respectively, it is possible to prevent the molds from being deformed by the weight or pressure applied thereto.

Further, since the temperature of the polymerization cell can be changed by allowing a heated fluid of at least two different temperatures to flow through the fluid passages formed in the heat conductors appropriately and separately, it is possible to change the temperatures required for each polymerization rate (i.e., process) at a high precision.

Further, since the heat conductors are each formed with at least one hollow portion (hole) in addition to the fluid passage formed therein to allow the temperature-controlled fluid to flow, it is possible to reduce the weight and the heat capacity of the heat conductors and thereby to increase the thermal transmission speed from the heat conductors to the metallic molds.

Further, since each of a pair of the opposing heat conductors is constructed in such a way that a plurality of square-shaped heat conducting plates are combined with one another by engaging the two opposing projecting and recessed engage portions formed on the two opposing side surfaces of the two adjacent heat conducting plates, respectively, and further by connecting two connect portions of the fluid passages also formed on the two opposing side surfaces (different from the two opposing side surfaces in which the engage portions are formed) of the two adjacent heat conducting plates respectively, it is possible to easily form the heat conductors of various sizes so as to be used for any polymerization cells of different sizes, so that sheets of various sizes can be manufactured easily.

In summary, in the manufacturing method according to the present invention, since heated fluid is allowed to flow through the heat conductors under temperature control conditions, the temperature of the polymerization cell can be controlled or changed more quickly and more uniformly, so that it is possible to manufacture a sheet of less internal stress or strain, as compared with the prior art method using a hot air oven. In addition, a thin lens sheet used for a large-sized projection screen can be also manufactured in accordance with the injection molding polymerization method (casing method).

BRIEF DESCRIPTION OF THE DRAWINGS

FIG. 1A is a cross-section view showing an embodiment of the plastic sheet manufacturing apparatus according to the present invention;

FIG. 1B is a plane view showing the heat conductors shown in FIG. 1A;

FIG. 4A is a cross-sectional view showing the plastic sheet manufacturing apparatus using a heat conductor composed of a plurality of heat conductive plates;

FIG. 4B is a plan view showing the plastic sheet manufacturing apparatus using the heat conductor composed of a plurality of the heat conductive plates;

DETAILED DESCRIPTION OF THE PREFERRED EMBODIMENTS

Figure 2A:
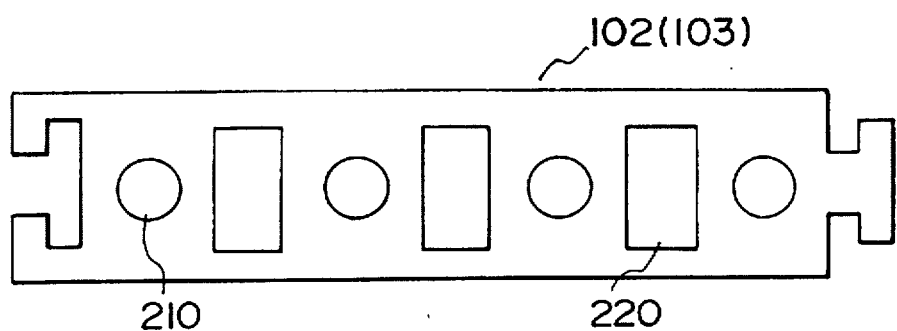
FIG. 2A is a cross-sectional view showing a fluid passage formed in the inside of the heat conductor.

The plastic sheet manufacturing method and apparatus according to the present invention will be described hereinbelow with reference to the attached drawings.

FIGS. 1A and 1B show the manufacturing apparatus used for the plastic sheet manufacturing method according to the present invention, in which FIG. 1B is a front view and FIG. 1A is a cross-sectional view taken along the line A1-A2 shown in FIG. 1B.

In FIGS. 1A and 1B, on the upper and lower sides of a polymerization cell (casing cell) 101, a first heat conducting plate (first heat conductor) 102 and a second heat conducting plate (second heat conductor) 103 are disposed, respectively. The polymerization cell 101 is formed by a metallic mold pair 104 and a gasket (mold frame) 105. The metallic mode pair 104 is composed of a first thin metallic mold (upper mold) 104A and a second thin metallic mold (lower mold) 104B, and the gasket (mold frame) 105 is sandwiched between the first and second molds (upper and lower molds) 104A and 104B. Further, two connecting ports 121 are provided on the side portion of each of the two (upper and lower) heat conducting plates 102 and 103, in order to allow a fluid (water) to flow through the two heat conducting plates 102 and 103, respectively. The first metallic mold (upper mold) 104A is bonded to the heat conducting plate 102 by use of a glue (bonding agent) 106. In the same way, the second metallic mold (lower mold) 104B is bonded to the heat conducting plate 103 by use of the glue (bonding agent) 106.

The method of manufacturing a plastic sheet according to the present invention will be explained by taking a case where a lenticular lens sheet is manufactured by use of the metallic mold and in accordance with cast molding polymerization method (casting method).

In the plastic sheet manufacturing method, as shown in FIG. 1A, MMA (methyl methacrylate acrylate) syrup 110 is injected, as a raw material of a plastic sheet, into the polymerization cell 101 composed of the metallic mold pair 104 and the mold frame (gasket) 105. After that, a fluid (hot water) 120 is passed through the two heat conductive plates 102 and 103, respectively, in order to polymerize the MMA syrup 110 by the heat of the fluid (hot water) 120, that is, to manufacture a plastic sheet by cast molding.

To each of a pair of the first and second thin-walled metallic molds 104A and 104B for constituting the metallic mold 104, the first and second heat conducting plates 102 and 103 are fixedly bonded, respectively. A fluid (water) 120 whose temperature is controlled is flowing through each of these two heat conducting plates 102 and 103. Further, the entire polymerization cell 101 is sandwiched between a pair of heat conducting plates 102 and 103, when the injected raw material is polymerized by heat. Therefore, it is possible to control the temperature of the polymerization cell 101 by controlling the temperature of the fluid (water) 120 flowing through the heat conducting plates 102 and 102.

The thin-walled metallic molds 104A and 104B used as a mother mold of the plastic sheet to be manufactured can be manufactured by an electro-forming (electro-casting) method.

In this embodiment, since the two first and second thin-walled metallic molds 104A and 104B are both fixed to two heat conductive plates 102 and 103, respectively, the two thin-walled metallic molds 104A and 104B are not easily deformed or distorted. Therefore, it is possible to manufacture a plastic sheet having a uniform and accurate thickness as a molded product, with the result that a high quality plastic sheet can be molded. Further, at the same time, since the hysteresis of internal stress or strain of the metallic mold 104 will not remain, it is possible to lengthen the life time of the metallic mold 104, as compared with the prior art case where the hot air oven is used.

The thickness of the plastic sheet which can be manufactured by the method according to the present invention was 1.5 mm or more in the case of the small-sized (50 inch or less) plastic sheet for use of the ordinary household appliance, 3 mm in the case of the large-sized (60 inch) plastic sheet for the business use, and 6 mm in the case of the large-sized (200 inch) plastic sheet for the business use.

Figure 2B:
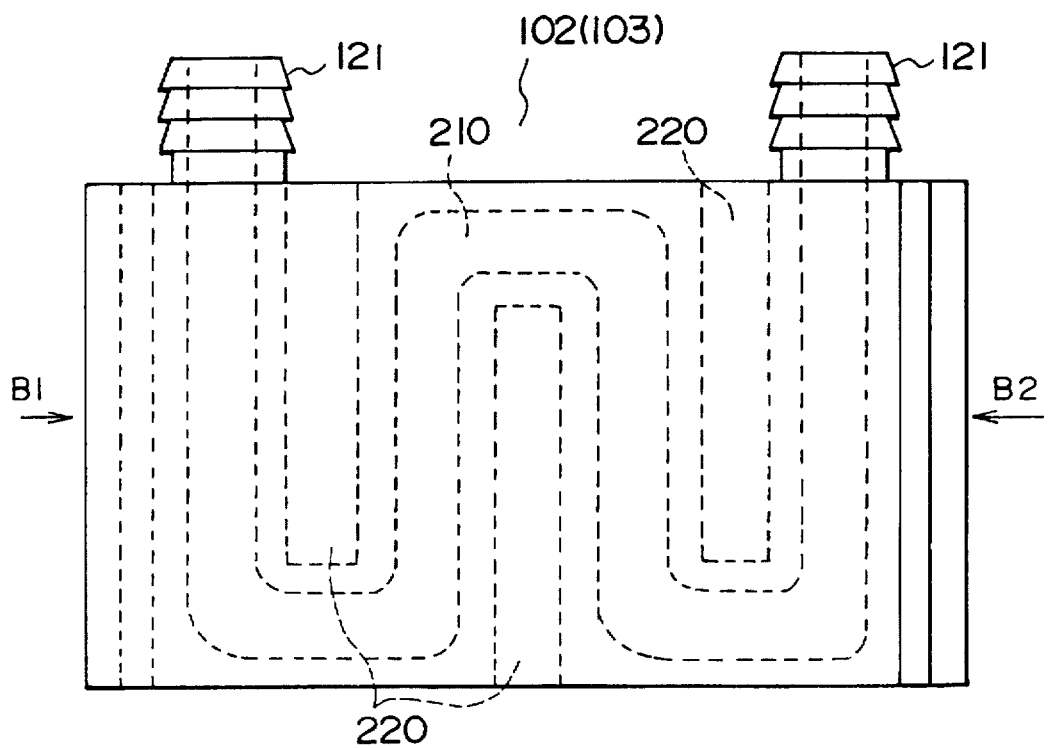
FIG. 2B is a plane view showing the fluid passage formed in the inside of the heat conductor.

Here, the heat conducting plate 102 (103) for sandwiching the polymerization cell 101 shown in FIGS. 1A and 1B will be described in further detail with reference to FIGS. 2A and 2B. FIG. 2B is a front view showing the heat conducting plate 102 (103), and FIG. 2A is a cross-sectional view taken along the line B1-B2 shown in FIG. 2B.

The heat conducting plate 102 (103) is formed with a fluid passage 210 through which a fluid whose temperature is controlled flows, and holes (hollow portions) 220 for reducing both the weight and the heat capacity of the heat conducting plate 102 (103).

In order to allow the temperature-controlled fluid to flow through the fluid passage 210, as shown in FIG. 2B, the fluid passage 210 is formed all over the surface of the heat conducting plate 102 (103), so that the temperature distribution of the polymerization cell can be uniformalized as much as possible.

As shown in FIG. 2B, it is preferable to form as many holes (hollow portions) 220 as possible so as not to intersect with the fluid passage 210. Further, as the material of the heat conducting plate 102 (103), aluminum is preferable, because aluminum is light in weight, small in heat capacity, and large in mechanical strength.

Here, a fluid passage circuit for supplying a hot fluid 120 to the heat conducting plate 102 (103) will be explained with reference to FIG. 3.

Figure 3:
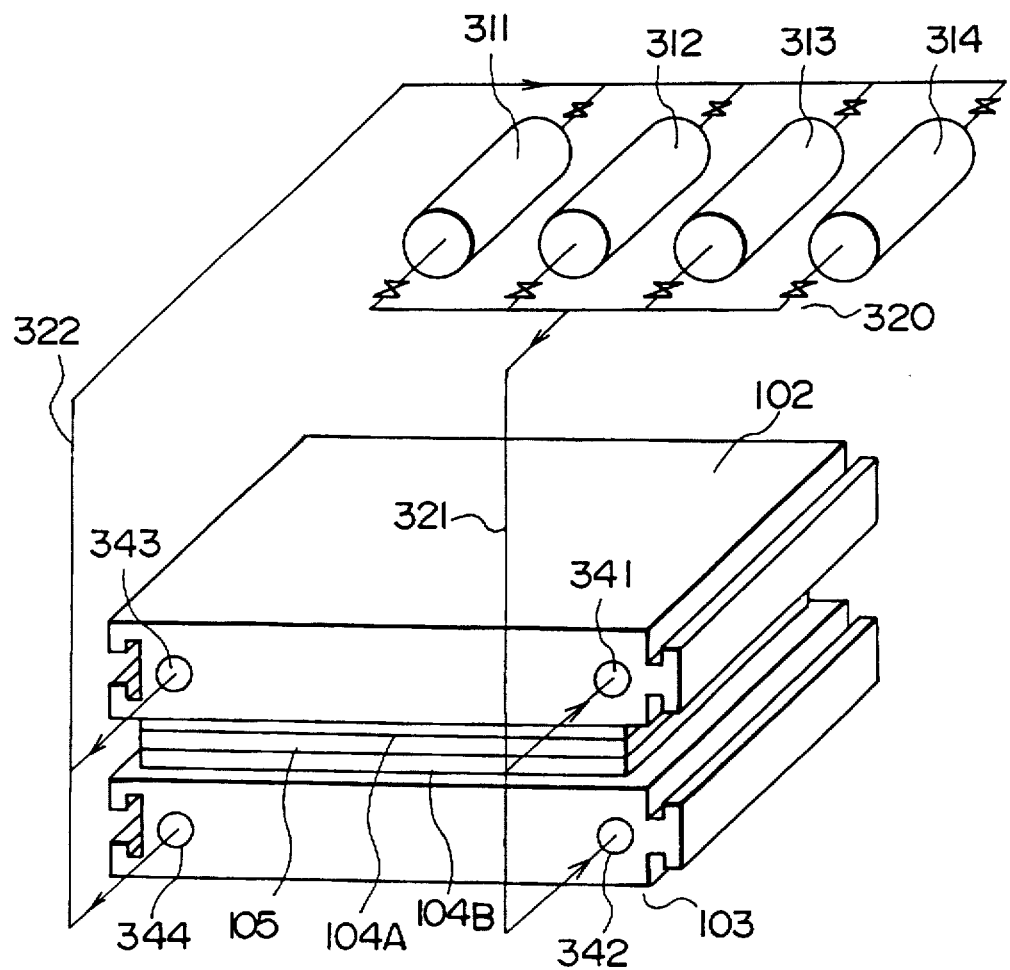
FIG. 3 is a perspective view showing a fluid passage circuit used for controlling the temperature of the heat conductors.

In FIG. 3, a plurality of valves 320 are provided for each end of a plurality of fluid tanks 311, 312, 313 and 314 all connected in parallel to each other. The fluid in the fluid tanks 311 to 314 is passed through an external fluid passage 321, injected into the heat conducting plate 102 (103) through a fluid inlet port 341 (342) formed in the heat conducting plate 102 (103); allowed to flow through the fluid passage 210 formed in the heat conducting plate 102 (103); exhausted from the heat conducting plate 102 (103) through a fluid outlet port 343 (344) formed in the heat conducting plate 102 (103); and then returned into the fluid tanks 311 to 314 through another external fluid passage 322, in such a way that the fluid can be recirculated.

Figure 8:
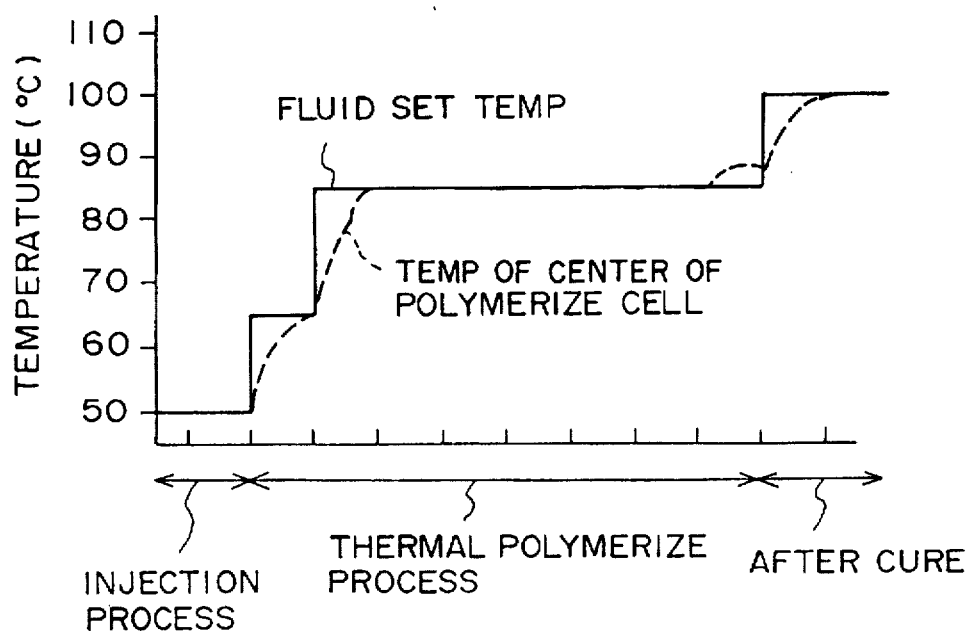
FIG. 8 is a temperature diagram (solid lines) set when a 40-inch Fresnel lens sheet was manufactured by use of a raw material different from the case shown in FIG. 7 in accordance with the method according to the present invention, and another temperature diagram (dot lines) measured actually.

Here, the fluids within the fluid tanks 311 to 314 shown in FIG. 3 are controlled to four predetermined different constant temperatures, respectively. This is because this method is suitable to change the temperature of the polymerization cell 101 more easily during the polymerization process. For instance, when the temperature of the polymerization cell 101 is required to be changed to a plurality of predetermined temperatures at different polymerization process times (as when the cell temperature is set to 50° C. at the injection process, to 70° C. at the thermal polymerization process, and to 100° C. at the after-curing process, as shown in FIG. 8), the temperature of fluid flowing through the heat conducting plate 102 and 103 can be switched easily by opening or closing the valves 320 stepwise.

In FIG. 3, although four fluid tanks are shown, it is also possible to provide at least one tank. In this case, however, since the temperature of the fluid within one tank must be changed in sequence in order to change the temperature of the polymerization cell 101 at a plurality of different process times, the controllability and the productivity are both lowered, as compared with when a plurality of fluid tanks are provided.

Further, a method of connecting a plurality of heat conducting plates will be described hereinbelow with reference to FIGS. 4A and 4B, which is suitable to manufacture a broad plastic sheet. FIG. 4B is a front view showing the two (upper and lower) heat conducting plate 402 and 403, and FIG. 4A is a cross-sectional view taken along the line C1—C1 shown in FIG. 4A.

The metallic mold 404 is composed of a first flat metallic mold (upper mold) 404A and a second metallic mold (lower mold) 404B formed with concentrically-formed Fresnel lenses. A gasket (mold frame) 405 is sandwiched between the first metallic mold (upper mold) 404A and the second metallic mold (lower mold) 404B. The heat conducting plate 402 is bonded to the first mold (upper mold) 404A, and the heat conducting plate 403 is bonded to the second mold (lower mold) 404B, both by use of a bonding agent 406, respectively.

As shown in FIG. 4A, each of the heat conducting plates 402 and 403 is constructed by connecting a plurality of plate members 402A, 402B and 402C or 403A, 403B and 403C one another in sequence.

Each plate member 402A, 402B and 402C is formed with an engage portion 430A formed into a projecting shape on one side thereof and another engage portion 430B formed into a recess shape on the other side thereof. Therefore, the projecting engage portion 430A of one plate member 402A is engaged with the recessed engage portion 430B of the other adjacent plate member 402B, and so on. In the same way, the three plate members 403A, 403B and 403C are connected to one another by use of these projecting and recessed engage portions formed in the plate members, respectively.

Further, as shown in FIGS. 4A and 4B, the plate members 402A, 402B and 402C are connected to one another in such a way that the side surfaces of these plate members are brought into tight contact with one another. In the same way, the plate members 403A, 403B and 403C are connected to one another in such a way that the side surfaces of these plate members are brought into tight contact with one another.

As shown in FIG. 4B, the plate member 402A is formed with a fluid inlet port 420 and a fluid outlet port 421 on one side surface of the plate member 402A (different from the side surfaces where the engage portions 430A and 430B are formed). The fluid outlet port 421 of the plate member 402A is connected to the fluid inlet port 42 of the other adjacent plate member 402B by use of a connecting member 440 and so on, so that a series of fluid passages can be formed through a plurality of the plate members 402A, 402B and 403C. In the same way, the plate member 403A is formed with a fluid inlet port 420 and a fluid outlet port 421 on one side surface of the plate member 403A (different from the side surfaces where the engage portions 430A and 430B are formed). The fluid outlet port 421 of the plate member 403A is connected to the fluid inlet port 420 of the other adjacent plate member 403*b* by use of a connecting member 440 and so on, so that a series of fluid passages can be formed through a plurality of the plate members 403A, 403B and 403C.

As described above, a polymerization cell for manufacturing a large-sized plastic sheet can be formed easily by constructing the heat conducting plate 402 (403) by connecting a plurality of the plate members 402A, 402B and 402C (403A, 403B and 403C). In this case, since the large-sized heat conducting plate 402 (403) can be constructed by connecting a plurality of small-sized plate members 402A, 402B and 402C, it is possible to simplify the manufacturing process of the heat conducting plate 402 (403), even when the heat conducting plates of various sizes are required according to the size of the plastic sheet required to be molded.

Figure 5A:
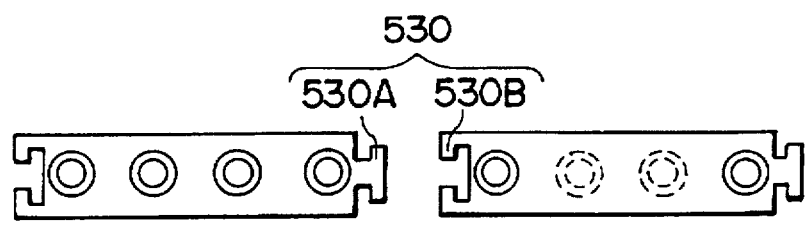
FIG. 5A is a cross-sectional view showing a connecting method of the heat conductor composed of a plurality of the heat conductive plates.
Figure 5B:
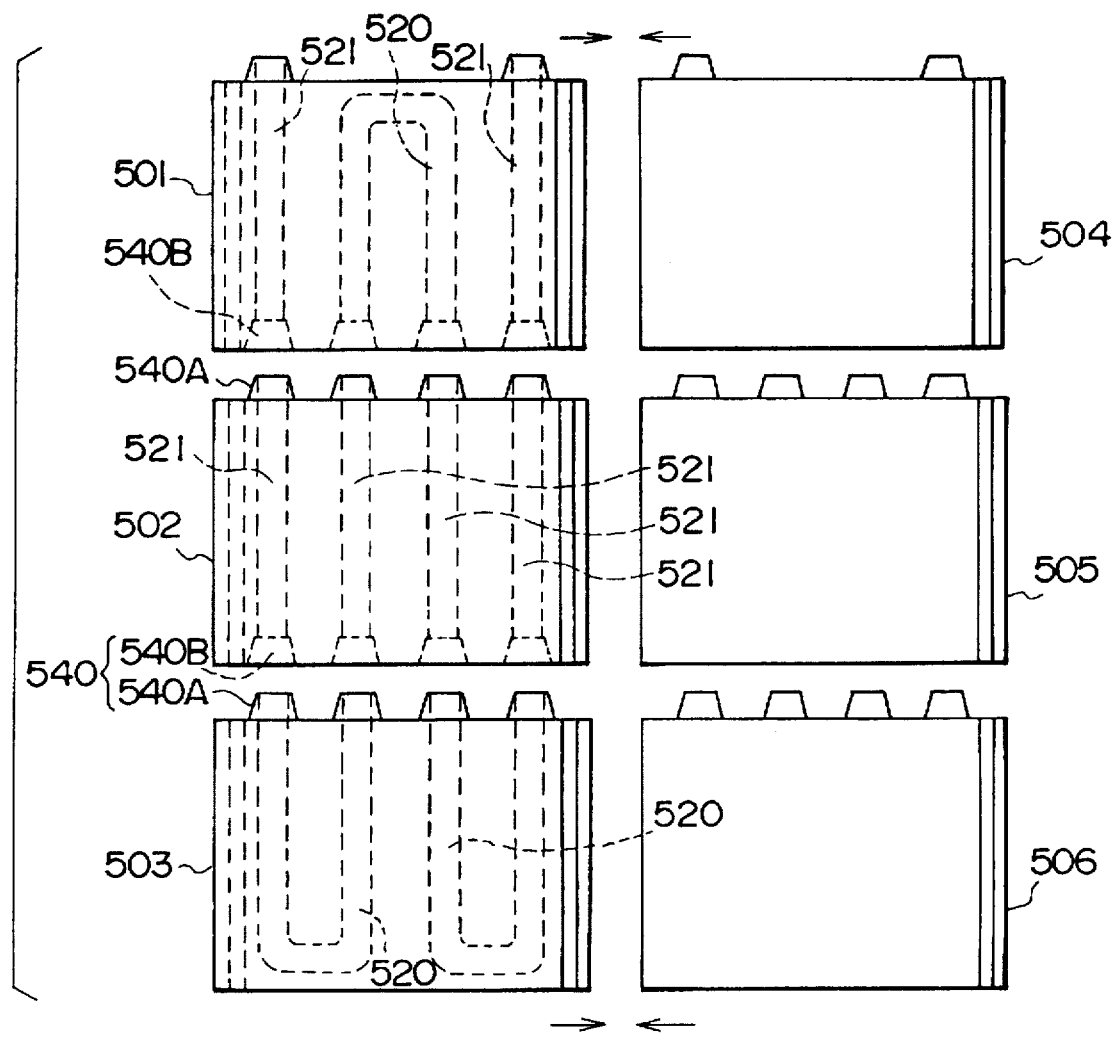
FIG. 5B is a plane view showing a connection method of the heat conductor composed of a plurality of the heat conductive plates.

Further, another method of connecting a plurality of heat conducting plates will be described hereinbelow with reference to FIGS. 5A and 5B, by which a broad plastic sheet extending in both the vertical and horizontal direction (in two dimensions) can be manufactured. FIG. 5B is a front view showing the heat conducting plates, and FIG. 5A is a cross-sectional view showing the same. In this example, a single heat conducting plate is constructed by connecting six plate members 501, 502, 503, 504, 505 and 506 by arranging two in the horizontal direction and three in the vertical direction. Each of the plate members 501, 502 and 503 arranged on the left side in the vertical direction in FIG. 5B is formed with an engage portion 530A formed into a projecting shape on one side surface thereof and with an engage portion 530B formed into a recessed portion 530B on the other side surface thereof. In the same way, each of the plate members 504, 505 and 506 arranged on the right side in the vertical direction in FIG. 5B is formed with an engage portion 530A formed into a projecting shape on one side surface thereof and with an engage portion 530B formed into a recessed portion 530B on the other side surface thereof.

Therefore, these projecting engage portions 530A and the recessed engage portions 530B formed on two opposing side surfaces of the respective plate members, respectively are engaged with each other to construct a large-sized heat conducting plate.

Further, in each of the two plate members 501 and 504 arranged on the upper side when connected to the other plate members, a single U-shaped flow passage 520 and two straight flow passages 521 (on both sides of the U-shaped flow passage 520) are formed, as shown by dashed lines in FIG. 5B. On the upper ends of the two fluid passages 521, two projecting connect portions 540A are formed. On the lower ends of the these four fluid passages 521 and 520, four recessed connect portions 540B are formed, respectively.

Further, in the plate members 502 and 505 arranged at the middle portion when connected to the other plate members, four straight flow passages 521 are formed, as shown by dashed lines in FIG. 5B. On the upper ends of the respective fluid passages 521, four projecting connect portions 540A are formed, respectively. On the lower ends of the respective fluid passages 521, four recessed connect portions 540B are formed, respectively.

Further, in each of the two plate members 503 and 506 arranged on the lower side when connected to the other plate members, two U-shaped flow passage 520 are formed, as shown by dashed lines in FIG. 5B. On the upper ends of the two U-shared flow passages 520, four projecting connect portions 540A are formed, respectively.

Therefore, when the four projecting connect portions 540A of the plate member 502 are engaged with the four recessed connect portions 540B of the adjacent plate member 501 and further when the four projecting connect portions 540A of the plate member 503 are engaged with the four recessed connect portions 540B of the adjacent plate member 502, respectively, it is possible to connect these plate members 501, 502 and 503 into a single plate member under such a state that the two opposing side surfaces thereof can be engaged with one another.

The same connecting method can be applied to the plate members 504, 505 and 506 arranged on the right side in the vertical direction in FIG. 5B.

Further, in order to reduce the weight and the heat capacity of the heat conducting plate, it is preferable to form holes (hollow portions) appropriately, although not shown in FIG. 3; FIGS. 4A and 4B; and FIGS. 5A and 5B.

Figure 6:
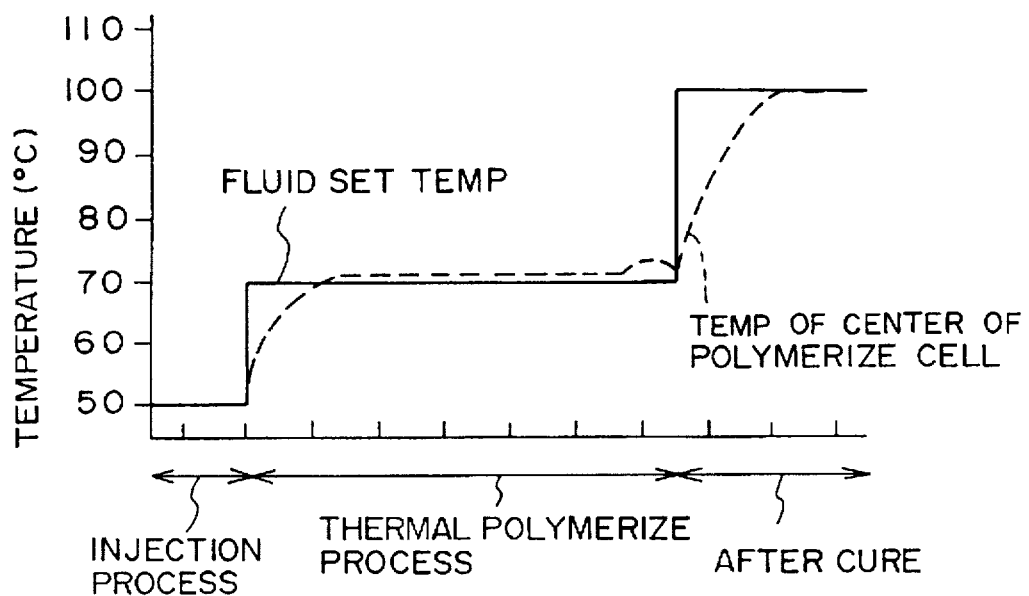
FIG. 6 is a temperature diagram (solid lines) set when a 40-inch Fresnel lens sheet was manufactured in accordance with the method according to the present invention, and another temperature diagram (dot lines) measured actually.

FIG. 6 shows a temperature curve measured during the polymerization process by the manufacturing method according to the present invention. In this process, a prepolymer containing MM (methyl methacrylate) and a oligomer of MM as the major component (whose viscosity of about one poise) was used as the raw material in order to manufacture a 40-inch Fresnel lens sheet by the polymerization of the raw material.

Further, in the polymerization process, two heat conducting plates (size: 590×790 cm; thickness: 3 mm) were connected to each other to form a single broad heat conducting plate (size: 1062×790; thickness: 3 mm) so as to sandwich the mother mold for forming a polymerization cell. Further, the mother mold was manufactured by electro-forming method. The mother mold was composed of a first (upper) aluminum mold and a second (lower) nickel mold. Both the upper and lower molds were about 3 mm in thickness and 900×700 cm in size. The upper mold was formed flat, but the lower mold was formed with a concentric Fresnel lens.

Figure 7:
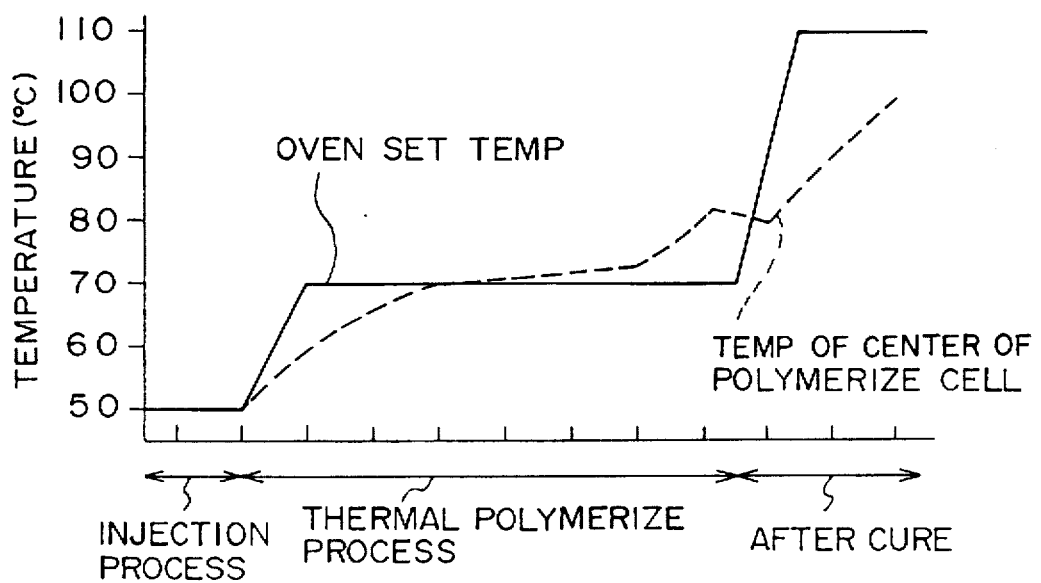
FIG. 7 is a temperature diagram (solid lines) set when a 40-inch Fresnel lens sheet was manufactured in accordance with the prior art method, and another temperature diagram (dot lines) measured actually.

In FIG. 6, the solid lines designate the set temperatures of hot water for each polymerization process such as the raw material injection process, the heat polymerization process of the injected raw material and the after-cure (hardening) process of the polymerized mold product, respectively. Further, the dashed lines designate the temperatures measured actually by use of a CA (chromel-alumel) thermocouple inserted into a roughly central position of the polymerization cell Further, for comparison, FIG. 7 shows the relationship between the set oven temperatures and the polymerization cell temperatures measured actually when the prior art polymerization method was adopted by use of the hot air oven. In FIG. 7, the solid lines designate the set temperatures of the hot air oven, and the dashed lines designate the temperatures measured actually by use of a CA (chromel-alumel) thermocouple inserted into a roughly central position of the polymerization cell.

The comparison between FIGS. 6 and 7 indicates that in the case of the polymerization process by the method according to the present invention, it is possible to shorten the time required to raise the temperature within the polymerization cell up to the set value, respectively, as compared with the case of the prior method which uses a hot air oven.

Further, in the manufacturing method according to the present invention, the peripheral positions of the polymerization cell were also measured by use of the CA (chromel-alumel) thermocouple. The measured results indicate that a difference in time required to reach the same temperature between the central position and the peripheral position of the polymerization cell is as short as about 2 min. In contrast with this, in the case of the prior art method using the hot air oven, a difference in time required to reach the same temperature between the hot air blown-off port and the opposite port was as long as 10 min.

Further, the thickness of the Fresnel lens obtained by the polymerization in the manufacturing method according to the present invention was roughly 3 mm and 3.2 mm at the maximum. In comparison with this, the thickness of the Fresnel lens obtained by the polymerization in the prior art manufacturing method using the hot air oven was roughly 3 mm but more than 3.5 mm at the central portion thereof.

In summary, in the manufacturing method according to the present invention, it is possible to shorten the manufacturing process time and to improve the quality of the molded products, as compared with the prior art method using the hot air oven.

FIG. 8 shows a temperature curve measured actually during the polymerization process of the manufacturing method according to the present invention. In this case, a 40-inch Fresnel lens sheet was polymerized by use of a raw liquid which includes MM (methyl methacrylate) and derivative of 20%, and styrene of 80%.

In FIG. 8, the solid lines designate the set temperatures of hot water, and the dashed lines designate the temperatures measured actually by use of a CA (chromel-alumel) thermocouple inserted into a roughly central position of the polymerization cell. Further, the construction of the manufacturing apparatus was the same as with the above-mentioned case.

In this case, since a relatively large amount of styrene of slow reaction (as compared with methacrylate family) was contained, the polymerization temperature is set to a relatively high value, and the polymerization cell was heated by two stages in order to maintain the temperature uniformity. In this case, it can be recognized that the temperature of the polymerization cell can be heated to a set temperature in a relatively short time.

Further, instead of the Fresnel lens sheet, a plastic sheet having a thickness of 2 mm was molded in accordance with the same manufacturing method. In this case, it has been also confirmed that the thickness distribution of the molded plastic sheet was excellent (i.e., small). In contrast with this, when the same plastic sheet was molded by the prior art method using the hot air oven, the upper and lower molds were brought into contact with each other (kiss touch) at the central position of the molds due to the bending of the metallic molds, so that the metallic molds were damaged, without obtaining any molded products.

Further, in the above-mentioned embodiments, the metallic molds are fixedly bonded to the heat conducting plates, respectively. However, when the thickness of the metallic mold is sufficiently large, since the metallic mold will not deformed by its weight, it is not necessary to bond the metallic mold to the heat conducting plate.

In this case, however, when an air layer is formed between the metallic mold and the heat conducting plate, the heat conductivity deteriorates. Therefore, it is preferable to form a bonding layer or to apply a liquid (e.g., oil) therebetween thinly.

Further, in the above-mentioned embodiments, the first and second heat conducting plates are of plate shape. Without being limited thereto, however, the heat conducting members of any shape can be used.

What is claimed is:

1. A plastic sheet manufacturing apparatus for manufacturing a plastic sheet by injecting a raw reactive material into a polymerization cell and polymerizing the raw reactive material by heat, comprising:
   first and second molds for forming the polymerization cell;
   first and second heat conductors attached to both outside surfaces of said first and second molds, respectively, so as to be opposed to each other and to sandwich said first and second molds therebetween, each of said first and second heat conductors being formed with a fluid passage therein to circulate a heated fluid; and
   control means for maintaining the heated fluid at a temperature which maintains the raw reactive material at a temperature higher than a temperature of the raw reactive material initially introduced into the polymerization cell.

2. The plastic sheet manufacturing apparatus of claim 1, wherein the polymerization cell comprises a pattern for forming a plurality of lenses in one or both surfaces of the plastic sheet.

3. The plastic sheet manufacturing apparatus of claim 1, further comprising a plurality of fluid tanks for carrying the heated fluid, each tank being connected to the fluid passages of said first and second heat conductors, respectively, in such a way as to be selectively switched, the heated fluids accumulated within the fluid tanks being controlled at different constant temperatures, respectively.

4. The plastic sheet manufacturing apparatus of claim 1, wherein each of said first and second heat conductors comprises of a plurality of heat conducting plates connected to one another and attached to each outside surface of said first and second molds; each heat conducting plate comprising at least one passage for allowing the heated fluid to flow therein, and an engage portion formed in one side portion thereof and another engage portion formed in the other opposing side portion thereof so as to be engaged with the engage portion formed in one side portion thereof; each heat conducting plate further comprising at least two connect portions for connecting each passage of each heat conducting plate.

5. The plastic sheet manufacturing apparatus of claim 4, wherein the heat conducting plates are substantially rectangular in shape, and the engage portions and the connect portions are formed on two mutually-different sides of the heat conducting plate, respectively.

6. The plastic sheet manufacturing apparatus of claim 1, wherein each of said first and second heat conductors further comprises at least one hollow portion different from the fluid passage therein.

7. The plastic sheet manufacturing apparatus of claim 1, wherein said first and second molds comprises metal.

8. The plastic sheet manufacturing apparatus of claim 1, wherein said first and second heat conductors are fixedly bonded to outer side surfaces of said first and second molds, respectively.

9. A plastic sheet manufacturing method for manufacturing a plastic sheet by injecting a raw reactive material into a polymerization cell and polymerizing the raw material by heat, comprising the steps of:
   preparing first and second molds for forming the polymerization cell;
   attaching first and second heat conductors to both outside surfaces of the first and second molds, respectively, so as to be opposed to each other and to sandwich the first and second molds therebetween, each of the first and second heat conductors being formed with a fluid passage therein; and
   circulating a heated fluid through the fluid passages formed in both the first and second heat conductors during polymerization of the raw reactive material, wherein the temperature of the heated fluid is controlled to maintain the raw reactive material at a temperature higher than a temperature of the raw reactive material initially introduced into the polymerization cell.

10. The plastic sheet manufacturing method of claim 9, wherein the heated fluid controlled at a predetermined temperature different from one manufacturing process to another is circulated through the fluid passages of the first and second heat conductors.

11. The plastic sheet manufacturing method of claim 9, wherein the heated fluid controlled at a predetermined temperature during the polymerization process is circulated through the fluid passages of the first and second heat conductors.

12. The plastic sheet manufacturing method of claim 9, wherein polymerization is divided into a plurality of different phases, and the heated fluid is controlled at a predetermined temperature different from one phase to another and is circulated through the fluid passages of the first and second heat conductors for each phase.

13. The plastic sheet manufacturing method of claim 9, wherein the polymerization cell comprises a pattern for forming a plurality of lenses in one or both surfaces of the plastic sheet.

14. The plastic sheet manufacturing method of claim 9, wherein each of said first and second heat conductors comprises a plurality of heat conducting plates connected to one another and attached to each outside surface of said first and second molds; each heat conducting plate comprising at least one passage for allowing the heated fluid to flow therein, and an engage portion formed in one side portion thereof and another engage portion formed in the other opposing side portion thereof so as to be engaged with the engage portion formed in one side portion thereof; each heat conducting plate further comprising at least two connect portions for connecting each passage of each heat conducting plate.

15. The plastic sheet manufacturing method of claim 14, wherein the heat conducting plates are substantially rectangular in shape, and the engage portions and the connect portions are formed on two mutually-different sides of the heat conducting plate, respectively.

16. The plastic sheet manufacturing method of claim 9, wherein each of the first and second heat conductors comprises at least one hollow portion different from the fluid passage therein.

17. The plastic sheet manufacturing method of claim 9, wherein the first and second molds comprises a metal.

18. The plastic sheet manufacturing method of claim 9, wherein the first and second heat conductors are fixedly bonded to outer side surfaces of the first and second molds, respectively.

* * * * *